US005128057A

United States Patent [19]

Bixenman et al.

[11] Patent Number: 5,128,057
[45] Date of Patent: Jul. 7, 1992

[54] FURFURYL ALCOHOL MIXTURES FOR USE AS CLEANING AGENTS

[75] Inventors: Michael L. Bixenman, Old Hickory, Tenn.; George C. Wolf, Kokomo, Ind.

[73] Assignees: Kyzen Corporation, Nashville, Tenn.; Delco Electronics Corporation, Kokomo, Ind.

[21] Appl. No.: 586,080

[22] Filed: Sep. 21, 1990

Related U.S. Application Data

[63] Continuation-in-part of Ser. No. 414,011, Sep. 29, 1989, abandoned.

[51] Int. Cl.[5] .......................... C09D 9/00; C11D 7/22; C11D 1/18; C11D 7/32

[52] U.S. Cl. .................................... 252/162; 252/153; 252/170; 252/171; 252/DIG. 8; 134/38; 134/39; 134/40

[58] Field of Search ............... 252/162, 153, 170, 171, 252/DIG. 8; 134/38, 39, 40

[56] References Cited

U.S. PATENT DOCUMENTS

| | | | |
|---|---|---|---|
| 4,207,621 | 6/1980 | Scardera et al. | 568/625 |
| 4,366,002 | 12/1982 | Carandang et al. | 252/103 |
| 4,568,395 | 2/1986 | Nabhani | 148/23 |
| 4,617,251 | 10/1986 | Sizensky | 134/38 |
| 4,664,721 | 5/1987 | Valasek | 134/38 |
| 4,737,195 | 4/1988 | Carandang et al. | 134/38 |
| 4,781,804 | 11/1988 | Wolf | 204/141.5 |

FOREIGN PATENT DOCUMENTS 1075517 6/1967 United Kingdom .

*Primary Examiner*—A. Lionel Clingman
*Assistant Examiner*—William S. Parks
*Attorney, Agent, or Firm*—Wegner, Cantor, Mueller & Player

[57] ABSTRACT

The present invention offers an alternative to the chlorofluorocarbons which have been used in the cleaning industry. In particular, the present invention uses a solution having tetrahydrofurfuryl alcohol (THFA) and an activator.

12 Claims, No Drawings

FURFURYL ALCOHOL MIXTURES FOR USE AS CLEANING AGENTS

This is a continuation-in part of U.S. application Ser. No. 07/414,011, filed Sep. 29, 1989, now abandoned.

BACKGROUND OF THE INVENTION

The present invention concerns the field of chemical cleaning agents. In particular, tetrahydrofurfuryl alcohol mixtures with certain activators are disclosed which can replace the use of chlorofluorocarbons (CFCs) in the cleaning industry. As activators, compounds of the formula

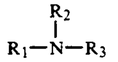

(I)

wherein $R_1$, $R_2$ and $R_3$ are independently hydrogen, $C_1$-$C_7$ alkyl, $C_5$-$C_6$ cycloalkyl, furanyl which can be substituted by $C_1$-$C_7$ alkyl, tetrahydrofuranyl which can be substituted by $C_1$-$C_7$ alkyl, pyrrolyl, pyrrolidinyl, benzyl which can be substituted by $C_1$-$C_7$ alkyl, phenyl which can be substituted by $C_1$-$C_7$ alkyl, $C_1$-$C_7$ alkenyl, $C_1$-$C_7$ alkynl, furfuryl which can be substituted by $C_1$-$C_7$ alkyl, or tetrahydrofurfuryl which can be substituted by $C_1$-$C_7$ alkyl, wherein $R_1$, $R_2$ and $R_3$ can be substituted by at least one hydroxy group, provided that $R_1$, $R_2$ and $R_3$ are not simultaneously hydrogen, or

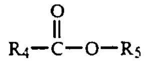

(II)

wherein $R_4$ is hydrogen, $C_1$-$C_6$ alkyl, $C_5$-$C_6$ cycloalkyl, furanyl which can be substituted by $C_1$-$C_6$ alkyl, tetrahydrofuranyl which can be substituted by $C_1$-$C_6$ alkyl, pyrrolyl, pyrrolidinyl, or benzyl which can be substituted by $C_1$-$C_6$ alkyl, $R_5$ is $C_1$-$C_6$ alkyl, $C_5$-$C_6$ cycloalkyl, furanyl which can be substituted by $C_1$-$C_6$ alkyl, tetrahydrofuranyl which can be substituted by $C_1$-$C_6$ alkyl, furfuryl which can be substituted by $C_1$-$C_6$ alkyl, tetrahydrofurfuryl which can be substituted by $C_1$-$C_6$ alkyl, pyrrolyl, pyrrolidinyl, benzyl which can be substituted by $C_1$-$C_6$ alkyl, or the group $$-(C)_a-O-(C)_b-O-(C)_b-OH$$

wherein a is from 1 to 3 and b is from 1 to 4, can be used.

In addition to the activators (I) or (II), the present invention can also include as activators cyclic or noncyclic diamines, pyrrolidone which can be substituted by $C_1$-$C_6$ alkyl or $C_1$-$C_6$ alkenyl, or butyrolactone.

The use of THFA and the activators of this invention offer a response to adverse findings by the atmospheric science community that have recently led the federal Environmental Protection Agency to severely restrict the use of CFCs. In particular, it has been found that chlorine and bromine from CFCs and halons are a primary factor in the seasonal loss of ozone at the South Pole known as the Antarctic "ozone hole". In 1987 alone, 50% of the ozone layer over Antarctica was destroyed during September and October. On a global basis, the ozone layer has shrunk an average of about 2.5% during the past decade. Many experts in the atmospheric science community are of the opinion that although there has been no massive loss of ozone observed in the Arctic, this area shows a very high potential for significant change. (Cf. C&EN, Jul. 24, 1989.) Thus, it is particularly important that the chemical industry find alternatives to the CFCs in use today.

Approximately 23% of all CFCs in use today concern compounds that are used in the chemical cleaning industry. Chlorofluorcarbons such as Freon TM, 1,1,1-trichloroethane, trichloroethylene, methylene chloride and aqueous caustic cleaners have been frequently used in the industry. In general, the actual cleaning process involves boiling the chlorofluorocarbon in a sump to produce a vapor zone. A contaminated working piece to be cleaned is placed in the sump. After the working piece has been immersed in the boiling cleaning solution for several minutes, it is then lifted to the vapor zone. In the vapor zone, condensation occurs which causes the contaminants to be rinsed from the working piece. These contaminants are usually undesirable materials such as oil, grease or flux. Often, this process can be repeated two or three times for further cleaning. It is also known to arrange such a process on a continuous basis. For example, a conveyor belt system can be used.

After several cycles of cleaning, the cleaning solution becomes spent and must be reclaimed. Reclamation is usually accomplished by unloading the spent solution to a distillation unit where the CFC portion to be recycled is separated from the contaminating flux residue. The CFC portion is recovered as the overhead product from the distillation unit, is condensed in an overhead receiver, and recycled back to the solvent cleaning system.

At present, CFC solvent cleaning systems typically use a multiple sump arrangement coupled to a distillation unit. To maximize efficiency, it is known to use a vacuum distillation system. However, such a multiple arrangement of units must be carefully designed to limit the amount of CFCs escaping into the atmosphere. This is not only an extremely difficult design task, but a costly system to build. Due to these drawbacks, many shortcuts have been taken in building solvent cleaning systems. Thus, the final operating system all too often allows excess amounts of CFCs to escape into the atmosphere.

It is imperative that the currently used CFC compounds be replaced as quickly as possible to prevent any further erosion of the ozone layer of the atmosphere. In addition, it is highly desirable to replace these compounds with a material that offers a high efficiency of cleaning at standard temperature and pressure conditions to reduce dangers inherent to operations personnel.

As a replacement for CFC compounds used in the cleaning industry, the use of tetrahydrofurfuryl alcohol (THFA) has been suggested. It is known that THFA is an excellent solvent which is completely miscible with water. Moreover, a variety of formulations containing tetrahydrofurfuryl alcohol are used in industry for such applications as textile cleaners to remove gear grease from cloth, oven cleaners, solvents for epoxy coatings, production line cleaners for the removal of resin solder flux in the electronics industry, brush cleaners where melting agents are applied, and for wash cleaning semiconductor elements.

The present invention not only takes advantage of the cleaning properties of THFA but improves upon those properties. Thus, the present invention serves as a benefit to the environment by having the ability to replace CFCs in the chemical cleaning industry as well as offers a significant improvement to known environmentally acceptable cleaning agents.

BRIEF SUMMARY OF THE INVENTION

The use of chlorofluorocarbons (CFCs) has been linked to the depletion of the Earth's ozone layer. Because this depletion has been so rapid, it is imperative that substitutes for CFCs be found as quickly as possible. The present invention offers an alternative to the CFCs which have been used in the cleaning industry. In particular, the present invention uses a solution having the combination of tetrahydrofurfuryl alcohol (THFA) and certain activators.

As activators, compounds of the formula

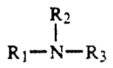

(I)

wherein $R_1$, $R_2$ and $R_3$ are independently hydrogen, $C_1$–$C_7$ alkyl, $C_5$–$C_6$ cycloalkyl, furanyl which can be substituted by $C_1$–$C_7$ alkyl, tetrahydrofuranyl which can be substituted by $C_1$–$C_7$ alkyl, pyrrolyl, pyrrolidinyl, benzyl which can be substituted by $C_1$–$C_7$ alkyl, phenyl which can be substituted by $C_1$–$C_7$ alkyl, $C_1$–$C_7$ alkenyl, $C_1$–$C_7$ alkynl, furfuryl which can be substituted by $C_1$–$C_7$ alkyl, or tetrahydrofurfuryl which can be substituted by $C_1$–$C_7$ alkyl, wherein $R_1$, $R_2$ and $R_3$ can be substituted by at least one hydroxy group, provided that $R_1$, $R_2$ and $R_3$ are not simultaneously hydrogen, or

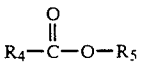

(II)

wherein $R_4$ is hydrogen, $C_1$–$C_6$ alkyl, $C_5$–$C_6$ cycloalkyl, furanyl which can be substituted by $C_1$–$C_6$ alkyl, tetrahydrofuranyl which can be substituted by $C_1$–$C_6$ alkyl, pyrrolyl, pyrrolidinyl, or benzyl which can be substituted by $C_1$–$C_6$ alkyl, $R_5$ is $C_1$–$C_6$ alkyl, $C_5$–$C_6$ cycloalkyl, furanyl which can be substituted by $C_1$–$C_6$ alkyl, tetrahydrofuranyl which can be substituted by $C_1$–$C_6$ alkyl, furfuryl which can be substituted by $C_1$–$C_6$ alkyl, tetrahydrofurfuryl which can be substituted by $C_1$–$C_6$ alkyl, pyrrolyl, pyrrolidinyl, benzyl which can be substituted by $C_1$–$C_6$ alkyl, or the group $$-(C)_a-O-(C)_b-O-(C)_b-OH$$

wherein a is from 1 to 3 and b is from 1 to 4, can be used.

In addition to the activators (I) or (II), the present invention can also include as activators cyclic or noncyclic diamines, pyrrolidone, which can be substituted by $C_1$–$C_6$ alkyl or $C_1$–$C_6$ alkenyl, or butyrolactone.

The solution of the present invention imparts low or no solution flammability and can be used to clean contaminating organic residues from electronic components. In a preferred embodiment, the solution of the present invention can be used to remove contaminating flux residues from hybrid alumina circuits and printed wiring boards.

In addition to the use of the inventive composition as a cleaning agent, the present invention contemplates a method of recycling spent solution. A hydrocarbon such as TCA can be mixed with the spent solution to absorb the flux residue removed from the working piece. The hydrocarbon-flux portion of the mixture is then separated in a water phase in which ionic contamination is entrapped. The remaining THFA solution is dewatered using a refrigeration technique. As an alternative to absorption and dewatering, fractional distillation can also be used in the recycle method.

The present invention also concerns a system for rinsing the cleaning solution. In particular, the rinsing system can incorporate the use of a degreasing machine.

DETAILED DESCRIPTION OF THE INVENTION

The present invention is concerned with the use of a mixture of tetrahydrofurfuryl alcohol and an activator as a cleaning agent. Such a cleaning agent can be used as a degreasing agent, an agent to remove flux residue from printed circuit boards or as a blanket wash agent in the printing industry.

In a preferred embodiment, the cleaning solution of the present invention can be used to clean and remove flux residues on electronic components. For example, prior to soldering the wiring board, a flux paste is applied to the board. The purpose of the flux paste is to remove any oxidation present. This assures an excellent surface prior to solder. However, after soldering, a portion of the flux paste remains on the board. This remaining portion is referred to as flux residue.

In the process of producing the wiring board, the board passes through many process steps and has gone through many handling steps prior to soldering. This process leaves the board with many other contaminants besides flux residue. The composition of this invention can also be used to clean these other contaminants from the board. In particular, from dust, oils, and grease can be removed.

Of particular concern in the cleaning of electronic components, is the cleaning of residue from hybrid alumina circuits and printed wiring boards. A hybrid alumina circuit is a ceramic board or substrate which has conductive metal runners printed on the surface. These runners are furnace fired onto the substrate using thick film inks made with metal powders and glass binders. Other components such as molded package integrated circuits, resistors, capacitors, high voltage ignition chips, thermistors and flip chips are then attached to these runners using additional furnace firing, flux soldering, adhesive bonding or wire bonding techniques.

The tetrahydrofurfuryl alcohol mixtures of the present invention are directed to the combination of tetrahydrofurfuryl alcohol and an activator of the formula

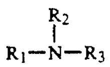

(I)

wherein $R_1$, $R_2$ and $R_3$ are independently hydrogen, $C_1$–$C_7$ alkyl, $C_5$–$C_6$ cycloalkyl, furanyl which can be substituted by $C_1$–$C_7$ alkyl, tetrahydrofuranyl which can be substituted by $C_1$–$C_7$ alkyl, pyrrolyl, pyrrolidinyl, benzyl which can be substituted by $C_1$–$C_7$ alkyl, phenyl which can be substituted by $C_1$–$C_7$ alkyl, $C_1$–$C_7$ alkenyl, $C_1$–$C_7$ alkynl, furfuryl which can be substituted by $C_1$–$C_7$ alkyl, or tetrahydrofurfuryl which can be substituted by $C_1$–$C_7$ alkyl, wherein $R_1$, $R_2$ and $R_3$ can be substituted by at least one hydroxy group, provided that $R_1$, $R_2$ and $R_3$ are not simultaneously hydrogen, or $$R_4-\overset{\overset{\displaystyle O}{\|}}{C}-O-R_5 \qquad (II)$$

wherein $R_4$is hydrogen, $C_1$–$C_6$ alkyl, $C_5$–$C_6$ cycloalkyl, furanyl which can be substituted by $C_1$–$C_6$ alkyl, tetrahydrofuranyl which can be substituted by $C_1$–$C_6$ alkyl, pyrrolyl, pyrrolidinyl, or benzyl which can be substituted by $C_1$–$C_6$ alkyl, $R_5$ is $C_1$–$C_6$ alkyl, $C_5$–$C_6$ cycloalkyl, furanyl which can be substituted by $C_1$–$C_6$ alkyl, tetrahydrofuranyl which can be substituted by $C_1$–$C_6$ alkyl, furfuryl which can be substituted by C1–C6 alkyl, tetrahydrofurfuryl which can be substituted by C1–C6 alkyl, pyrrolyl, pyrrolidinyl, benzyl which can be substituted by $C_1$–$C_6$ alkyl, or the group $$-(C)_a-O-(C)_b-O-(C)_b-OH$$

wherein a is from 1 to 3 and b is from 1 to 4.

Included in the activators (I) or (II) are amines. Amines such as tetrahydrofurfurylamine, diethylamine, and triethylamine are preferred.

Included in the activators (I) or (II) are alkanolamines. Alkanolamines such as ethanolamine, diethanolamine, triethanolamine, isobutanolamine and ethylpropanediolamine are preferred.

Included in the activators (I) or (II) are esters. Esters such as phenyl acetate, dipropylene glycol monomethyl acetate, propylene glycol monomethyl acetate and tetrahydrofurfuryl acetate are preferred.

In addition to the activators (I) or (II), the present invention can also include as activators cyclic or noncyclic diamines such as 1,3-diaminocyclohexane, 1,4-diaminocyclohexane, orthophenylenediamine, metaphenylenediamine, paraphenylenediamine, 2-methylpentamethylenediamine, hexamethylenediamine, 1,12-dodecanediamine and bishexamethylenediamine.

In addition to the activators (I), (II) or cyclic or noncyclic diamines, the present invention can also include as an activator pyrrolidone, which can be substituted by $C_1$-$C_6$ alkyl or $C_1$-$C_6$ alkenyl, or butyrolactone. As pyrrolidone, 2-pyrrolidone, N-methyl-2-pyrrolidone, N-ethyl-2-pyrrolidone or N-vinyl-2-pyrrolidone can be used. Preferably, N-methyl-2-pyrrolidone is used.

The combination of THFA and the activator of this invention is found to give markedly improved cleaning ability as compared to THFA alone. It is preferred that the THFA be included in an aqueous solution having at least 1% w/w THFA. It is also preferred that the activator be included in the aqueous solution at a final concentration of at least 0.01% w/w.

The tetrahydrofurfuryl alcohol mixtures of the present invention can also include a non-ionic surfactant. Non-ionic surfactants which can be used are surfactants made from primary, linear, monohydric alcohols. These alcohols preferably include from 16 to 18 carbon atoms and can also include ethylene oxide. Examples of nonionic surfactants include Mezawett 77 TM which is an alkyl ester-based surfactant manufactured by Mazer Chemicals, a division of PPG Chemicals, Gurnee, Ill.; nonylphenoxpoly (ethyleneoxy) ethanol manufactured by GAF Corporation, New York, N.Y.; nonyl phenol ethoxylate, Makon NF 5 TM and Makon NF 12 TM manufactured by Stephen Chemical Co., Northfield, Ill.; and nonionic fluorinated alkylester surfactant manufactured by 3M Company, St. Paul, Minn.

Other surfactants include nonylphenol ethoxylates with a 4 to 40 mole range of ethoxylate (i.e. ethylene oxide or polymers of ethylene oxide) addition, phenol ethoxylates with a 1 to 10 mole range of ethoxylate addition, fluorinated alkyl esters, fluorinated alkyl alkoxylates, decylphenol ethoxylates with a 4 to 40 mole range of ethoxylate addition, and octylphenol ethoxylates with a 4 to 40 mole range of ethoxylate addition. It is preferred that the non-ionic surfactants of the present invention be added to solution in a concentration of at least 0.001% w/w.

The solution of the present invention can be contacted with the working piece by spraying, dipping or brushing. The working piece is then rinsed with a rinsing solution such as water, alcohol or a fluorinated hydrocarbon.

As fluorinated hydrocarbons, fluorinated alkanes and polyethers are preferred. With respect to fluorinated alkanes, compounds of the formula $$C_nF_{2n+2}$$

wherein n is from 1 to 16 can be used. The preferred fluorinated alkane is fully fluorinated hexane.

Polyethers which can be used as the rinsing solution of this invention are compounds of the formula $$CF_3-[(O-CF_2)_n-(O-\underset{\underset{\displaystyle CF_3}{|}}{C}F-CF_2)_m]-O-CF_3$$

wherein n is from 0 to 16 and m is from 0 to 16.

As alcohols, the rinsing solution of the present invention can use $C_1$-$C_6$ alkyl alcohol, $C_5$-$C_6$ cycloalkyl alcohol, amyl alcohol, allyl alcohol, crotyl alcohol, benzyl alcohol or tetrahydrofurfuryl alcohol.

The cleaning process can be accomplished at standard temperature and pressure (STP) conditions. However, by increasing contact time, force of agitation, or temperature of the mixture, of this invention cleaning time can be reduced. For practical reasons, it is preferred that the cleaning system be operated at a temperature below the boiling point of the particular rinsing solution. It is particularly desirable to maintain the temperature of the system above about 15° C. below the boiling point of the cleaning solution. Once the working piece has been cleaned, it is made finally ready by air drying or by drying with infrared heaters.

Another important aspect of the present invention is the recycling of the cleaning mixture. The mixture is recycled when it becomes spent. The mixture is determined to be spent when it no longer cleans adequately. The time it takes for the mixture to become spent is variable and primarily dependent upon the quantity of flux residue being removed. To recycle the mixture, the spent solution can be mixed with 1-1-1 trichloroethane (TCA) which absorbs the flux residue cleaned from the working piece. Water is added to the spent mixture thereby forming a two phase solution of water soluble and non-water soluble components. The non-water soluble phase contains the trichloroethane and the flux residue. The water soluble phase contains the THFA. The water phase is separated and sent to a refrigerated rotating drum. The water freezes out of solution on the drum surface returning the THFA to the cleaning tank. The frozen water is then removed from the drum surface. The flux residues can be removed from the non-water soluble phase by standard distillation methods. Other solvents can be used to replace trichloroethane, the properties of which are within the purview of one of ordinary skill in the are. Examples of such solvents are trichloroethylene, toluene and xylene. If preferred, fractional distillation can be used as an alternative to absorption and dewatering.

Of course, other ingredients can be included in the mixtures of this invention. Such ingredients are typically used to alter various physical properties such as viscosity, rate of vaporization, boiling point, odor, color, and other features generally desirable to the consumer. Many of the features of this invention are demonstrated in the nonlimiting examples which follow. Many of the Examples measure effectiveness of the solutions of this invention by measuring the used solution with an Omega Meter and converting the meter reading to sodium chloride equivalents, i.e., $\mu g/cm^2$. Measurement of resistivity of a solution after it has been used to clean a component is a common practice in the art. A low value indicates that a large amount of residue has been removed.

EXAMPLE 1

An aqueous solution of the present invention is prepared which contains 90% by volume THFA, 4% tetrahydrofurfurylamine and 2% Mezawett 77 TM. A portion of the solution is placed in a container labelled A and a portion of the solution is placed in a container labelled B. A UTD circuit board containing flux is dipped in container A and a UTD circuit board containing flux is dipped in container B. The boards are rinsed and hot air dried. Neither of the cleaned boards is observed to have residue.

EXAMPLE 2

The solutions of containers A and B used to clean the boards in Example 1 are examined with an Omega Meter and the value is converted to sodium chloride equivalents. It is found that solution A has a reading of 0.385 $\mu g/cm^2$ and that solution B has a reading of 0.519 $\mu g/cm^2$.

EXAMPLE 3

A portion of the prepared solution of Example 1 is diluted with water to give an overall dilution of 85%. The diluted solution is placed into a container labelled C. A UTD circuit board containing flux is dipped into the container. The board is rinsed and hot air dried. No residue is observed.

EXAMPLE 4

The solution of container C used to clean the board in Example 3 is examined with an Omega Meter and the value is converted to sodium chloride equivalents. It is found that solution C has a reading of 0.493 $\mu g/cm^2$.

EXAMPLE 5

A portion of the prepared solution of Example 1 is diluted with water to give an overall dilution of 70%. The diluted solution is placed into a container labelled D. A UTD circuit board containing flux is dipped into the container. The board is rinsed and hot air dried. No residue is observed.

EXAMPLE 6

The solution of container D used to clean the board in Example 5 is examined with an Omega Meter and the value is converted to sodium chloride equivalents. It is found that solution D has a reading of 0.455 $\mu g/cm^2$.

EXAMPLE 7

Solutions are prepared using 80% w/w THFA, 15% water and 5% amine. The amines selected are tetrahydrofurfurylamine, diethylamine and triethylamine. The solutions are placed into containers. A UTD circuit board containing flux is dipped into each container. The boards are rinsed with water and hot air dried. All of the boards were cleaned with no visible residue in about 2 minutes.

EXAMPLE 8

Solutions are prepared using 80% w/w THFA, 15% water and 5% alkanolamine. The alkanolamines selected are monoethanolamine, diethanolamine, triethanolamine, isobutanolamine and ethylpropanediolamine. The solutions are placed into containers. A UTD circuit board containing flux is dipped into each container. The boards are rinsed with water and hot air dried. None of the cleaned boards is observed to have residue. The solutions of nonoethanolamine, diethanolamine and isobutanolamine took about 1 minute to the board and the remaining solutions took about 2 minutes to clean the boards.

EXAMPLE 9

Solutions are prepared using 80% w/w THFA, 15% water and 5% ester. Esters selected are dipropylene glycol monomethyl acetate, propylene glycol monomethyl acetate and tetrahydrofurfuryl acetate. The solutions are placed into containers. A UTD circuit board containing flux is dipped into each container. The boards are rinsed with water and hot air dried. None of the boards is observed to have a residue after 2 minutes of immersion.

EXAMPLE 10

A solution is prepared using 4.5% w/w THFA, 90% water, 2.5% monoethanolamine and 3.0% phenol ethoxylate with mole of ethylene oxide. The solution was placed in a container, and 5 UTD circuit boards containing flux were dipped into the container. The boards were rinsed with water and hot air dried. None of the cleaned boards was observed to have residue. Many of the boards were cleaned in 45 seconds. Upon heating the material to 140° F., the boards were cleaned almost instantaneously.

EXAMPLE 11

A solution is prepared using 17.5% w/w THFA, 75% water, monoethanolamine, 2.0% isobutanolamine, 1.25% phenol ethoxylate, 1 mole ethylene oxide, and 3.75% Mezawett 77 TM. The solution was placed in a container, and 5 UTD circuit boards containing flux residue were dipped into the container. The boards were rinsed with water and hot air dried. None of the cleaned boards was observed to have residue. Many of the boards were cleaned in 30 seconds. Upon heating the material to 140° F., the boards were cleaned almost instantaneously.

EXAMPLE 12

The solution of Example 11 was rinsed with fully fluorinated hexane. The material was completely rinsed with no visible residue.

EXAMPLE 13

The solution of Example 11 was rinsed with a perfluorinated polyether. The material was completely rinsed with no visible residue.

What is claimed is:

1. A flux removing agent for removing flux residue from an electronic component, said agent being effective for use at standard temperature and pressure conditions, at a temperature below the boiling point of the agent without harming the component comprising an effective amount of tetrahydrofurfuryl alcohol and an activator of the formula

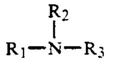

(I)

wherein $R_1$, $R_2$ and $R_3$ are independently hydrogen, $C_1$-$C_7$ alkyl, $C_5$-$C_6$ cycloalkyl, furanyl which can be substituted by $C_1$-$C_7$ alkyl, tetrahydrofuranyl which can be substituted by $C_1$-$C_7$ alkyl, pyrrolyl, pyrrolidinyl, benzyl which can be substituted by $C_1$-$C_7$ alkyl, $C_1$-$C_7$ alkenyl, $C_1$-$C_7$ alkynl, furfuryl which can be substituted by $C_1$-$C_7$ alkyl, or tetrahydrofurfuryl which can be substituted by $C_1$-$C_7$ alkyl, wherein $R_1$, $R_2$ and $R_3$ can be substituted by at least one hydroxy group, provided that $R_1$, $R_2$ and $R_3$ are not simultaneously hydrogen, or

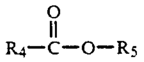

(II)

wherein $R_4$ is hydrogen, $C_1$-$C_6$ alkyl, $C_5$-$C_6$ cycloalkyl, furanyl which can be substituted by $C_1$-$C_6$ alkyl, tetrahydrofuranyl which can be substituted by $C_1$-$C_6$ alkyl, pyrrolyl, pyrrolidinyl, or benzyl which can be substituted by $C_1$-$C_6$ alkyl, $R_5$ is $C_1$-$C_6$ alkyl, $C_5$-$C_6$ cycloalkyl, furanyl which can be substituted by $C_1$-$C_6$ alkyl, tetrahydrofuranyl which can be substituted by $C_1$-$C_6$ alkyl, furfuryl which can be substituted by $C_1$-$C_6$ alkyl, tetrahydrofurfuryl which can be substituted by $C_1$-$C_6$ alkyl, pyrrolyl, pyrrolidinyl, benzyl which can be substituted by $C_1$-$C_6$ alkyl, or the group $$-(C)_a-O-(C)_b-O-(C)_b-OH$$

wherein a is from 1 to 3 and b is from 1 to 4.

2. The flux removing agent of claim 1, wherein the activator is selected from the group consisting of tetrahydrofurfurylamine, diethylamine, and triethylamine.

3. The flux removing agent of claim 1, wherein the activator is ethanolamine, diethanolamine, triethanolamine, isobutanolamine and ethylpropanediolamine.

4. The flux removing agent of claim 1, wherein the activator is 1,3-diaminocyclohexane, 1,4-diaminocyclohexane, orthophenylenediamine, metaphenylenediamine, paraphenylenediamine, 2-methylpentamethylenediamine, hexamethylenediamine, 1,12-dodecanediamine and bishexamethylenediamine..

5. The flux removing agent of claim 1, wherein the activator is dipropylene glycol monomethyl acetate, propylene glycol monomethyl acetate or tetrahydrofurfuryl acetate.

6. The flux removing agent of claims 1, 2, 3, 4 or 6 further comprising the addition of a non-ionic surfactant.

7. The flux removing agent of claim 6, wherein the non-ionic surfactant is made from a primary, linear, monohydric alcohol having from 16 to 18 carbon atoms.

8. The flux removing agent of claim 2, wherein the activator is tetrahydrofurfurylamine.

9. The flux removing agent of claim 1, wherein the tetrahydrofurfuryl alcohol is in a concentration of at least 8% by volume and the tetrahydrofurfurylamine is in a concentration of at least 0.01% w/w.

10. The flux removing agent of claim 1 consisting essentially of an effective amount of said tetrahydrofurfuryl alcohol and said activator.

11. The flux removing agent of claim 1, wherein said temperature below the boiling point of the agent is up to about 140° F.

12. A flux removing agent for removing flux residue from an electronic component, said agent being effective for use at standard temperature and pressure conditions, at a temperature below the boiling point of the agent without harming the component comprising an effective amount of tetrahydrofurfuryl alcohol and an activator of the formula

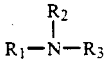

(I)

wherein $R_1$, $R_2$ and $R_3$ are independently hydrogen, $C_1$-$C_7$ alkyl, $C_5$-$C_6$ cycloalkyl, furanyl which can be substituted by $C_1$-$C_7$ alkyl, tetrahydrofuranyl which can be substituted by $C_1$-$C_7$ alkyl, pyrrolyl, pyrrolidinyl, benzyl which can be substituted by $C_1$-$C_7$ alkyl, $C_1$-$C_7$ alkenyl, $C_1$-$C_7$ alkynl, furfuryl which can be substituted by $C_1$-$C_7$ alkyl, or tetrahydrofurfuryl which can be substituted by $C_1$-$C_7$ alkyl, wherein $R_1$, $R_2$ and $R_3$ can be substituted by at least one hydroxy group, provided that $R_1$, $R_2$ and $R_3$ are not simultaneously hydrogen.

* * * * *